(12) United States Patent
Zewail et al.

(10) Patent No.: US 12,184,570 B2
(45) Date of Patent: Dec. 31, 2024

(54) PHASE TRACKING REFERENCE SIGNALS (PTRSS) WITH ZERO POWER (ZP) TONES

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/446,916

(22) Filed: Sep. 3, 2021

(65) Prior Publication Data
US 2022/0109539 A1     Apr. 7, 2022

Related U.S. Application Data

(60) Provisional application No. 63/088,329, filed on Oct. 6, 2020.

(51) Int. Cl.
*H04L 5/00*     (2006.01)
*H04L 25/02*    (2006.01)

(52) U.S. Cl.
CPC ........ *H04L 5/0048* (2013.01); *H04L 25/0202* (2013.01)

(58) Field of Classification Search
CPC . H04L 25/0202; H04L 5/0048; H04L 5/0073; H04L 5/0091
See application file for complete search history.

(56) References Cited

U.S. PATENT DOCUMENTS

| | | | |
|---|---|---|---|
| 2018/0359069 A1* | 12/2018 | Nam | H04B 17/345 |
| 2019/0296877 A1* | 9/2019 | Zhang | H04L 5/0048 |
| 2020/0092032 A1* | 3/2020 | Zhang | H04W 72/23 |
| 2021/0160025 A1* | 5/2021 | Gao | H04L 5/0094 |
| 2023/0054308 A1* | 2/2023 | Yang | H04L 5/0048 |

FOREIGN PATENT DOCUMENTS

WO    WO 2019/048050 A1 *  3/2019 ............. H04L 27/26

* cited by examiner

*Primary Examiner* — Mansour Oveissi
(74) *Attorney, Agent, or Firm* — Patterson & Sheridan, L.L.P.

(57) ABSTRACT

Aspects of the present disclosure can be implemented in a method for wireless communication by a first wireless node. The method generally includes receiving, from a second wireless node, information regarding PTRS tones, designating one or more of the PTRS tones as ZP tones and one or more of the PTRS tones as NZP tones based, at least in part, on the information, and transmitting a PTRS on the NZP tones. In some cases, the first wireless node is a user equipment (UE) and the second wireless node is a network entity. In some cases, the first wireless node is a network entity and the second wireless node is a UE.

28 Claims, 13 Drawing Sheets

500

| Scheduled MCS | Time Density ($L_{PT-RS}$) |
|---|---|
| $I_{MCS}$ < ptrs-MCS1 | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Time density of a PT-RS as a function of scheduled MCS

| Scheduled Bandwidth | Frequency Density ($K_{PT-RS}$) (1/n) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Frequency density of a PT-RS as a function of scheduled bandwidth

FIG. 6

PHASE TRACKING REFERENCE SIGNALS (PTRSS) WITH ZERO POWER (ZP) TONES

CROSS-REFERENCE TO RELATED APPLICATION

This application claims benefit of and priority to U.S. Provisional Application No. 63/088,329 filed Oct. 6, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for introducing zero power (ZP) tones in phase tracking reference signals (PTRSs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

As the demand for mobile broadband access continues to increase, there exists a need for further improvements in the NR and the LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved techniques for introducing zero power (ZP) tones in phase tracking reference signals (PTRSs).

Certain aspects of the subject matter described in this disclosure can be implemented in a method for wireless communications by a first wireless node. The method generally includes receiving, from a second wireless node, information regarding phase tracking reference signal (PTRS) tones; designating one or more of the PTRS tones as zero power (ZP) tones and one or more of the PTRS tones as non-ZP (NZP) tones based, at least in part, on the information; and transmitting a PTRS on the NZP tones.

Certain aspects of the subject matter described in this disclosure can be implemented in a method for wireless communication by a first wireless node. The method generally includes transmitting, to a second wireless node, information regarding PTRS tones for use in designating one or more of the PTRS tones as ZP tones and one or more of the PTRS tones as NZP tones; receiving a PTRS transmitted on the NZP tones of the one or more PTRS tones; and estimating filter coefficients for an ICI filter based on the PTRS received on the NZP tones.

Certain aspects of the subject matter described in this disclosure can be implemented in an apparatus for wireless communication by a first wireless node. The apparatus generally includes a memory and one or more processors coupled to the memory, the memory and the one or more processors being configured to: receive, from a second wireless node, information regarding PTRS tones; designate one or more of the PTRS tones as ZP tones and one or more of the PTRS tones as NZP tones based, at least in part, on the information; and transmit a PTRS on the NZP tones.

Certain aspects of the subject matter described in this disclosure can be implemented in an apparatus for wireless communication by a first wireless node. The apparatus generally includes a memory and one or more processors coupled to the memory, the memory and the one or more processors being configured to: transmit, to a second wireless node, information regarding PTRS tones for use in designating one or more of the PTRS tones as ZP tones and one or more of the PTRS tones as NZP tones; receive a PTRS transmitted on the NZP tones of the one or more PTRS tones; and estimate filter coefficients for an ICI filter based on the PTRS received on the NZP tones.

Certain aspects of the subject matter described in this disclosure can be implemented in an apparatus for wireless communication by a first wireless node. The apparatus generally includes means for receiving, from a second wireless node, information regarding PTRS tones; means for designating one or more of the PTRS tones as ZP tones and one or more of the PTRS tones as NZP tones based, at least in part, on the information; and means for transmitting a PTRS on the NZP tones.

Certain aspects of the subject matter described in this disclosure can be implemented in an apparatus for wireless communication by a first wireless node. The apparatus generally includes means for transmitting, to a second wireless node, information regarding PTRS tones for use in designating one or more of the PTRS tones as ZP tones and one or more of the PTRS tones as NZP tones; means for receiving a PTRS transmitted on the NZP tones of the one or more PTRS tones; and means for estimating filter coefficients for an ICI filter based on the PTRS received on the NZP tones.

Certain aspects of the subject matter described in this disclosure provide a non-transitory computer-readable medium comprising executable instructions that, when executed by one or more processors of a first wireless node, cause the first wireless node to: receive, from a second wireless node, information regarding PTRS tones; designate one or more of the PTRS tones as ZP tones and one or more of the PTRS tones as NZP tones based, at least in part, on the information; and transmit a PTRS on the NZP tones.

Certain aspects of the subject matter described in this disclosure provide a non-transitory computer-readable medium comprising executable instructions that, when executed by one or more processors of a first wireless node, cause the first wireless node to: transmit, to a second wireless node, information regarding PTRS tones for use in designating one or more of the PTRS tones as ZP tones and one or more of the PTRS tones as NZP tones; receive a PTRS transmitted on the NZP tones of the one or more PTRS tones; and estimate filter coefficients for an ICI filter based on the PTRS received on the NZP tones.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

FIG. 5 illustrates an example table of a time density of PTRSs as a function of a scheduled modulation and coding scheme (MCS), in accordance with certain aspects of the present disclosure.

FIG. 6 illustrates an example table of a frequency density of PTRSs as a function of a scheduled bandwidth, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
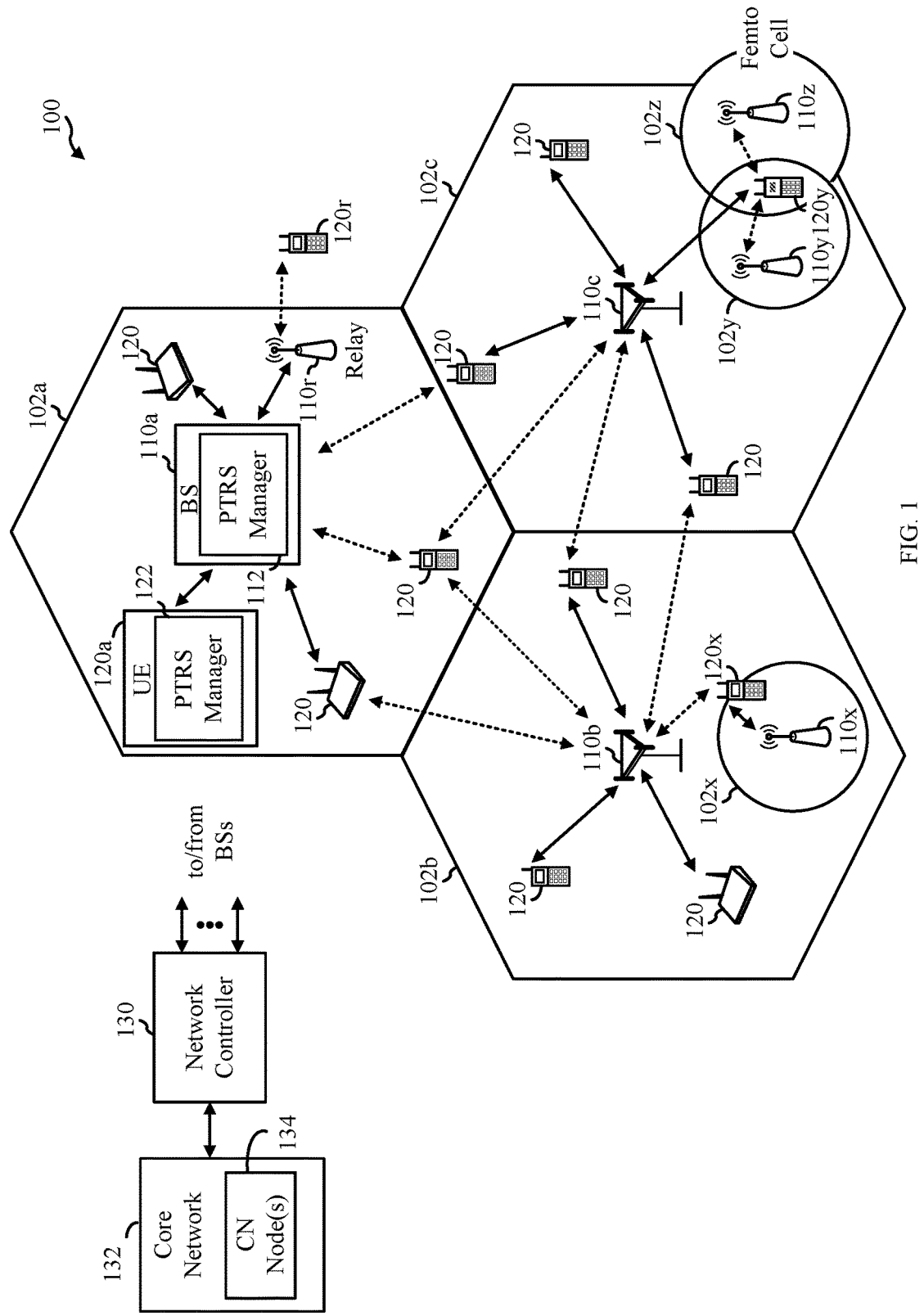
FIG. 1 is a block diagram conceptually illustrating an example wireless system, in accordance with certain aspects of the present disclosure.

Aspects of the present disclosure provide techniques for introducing zero power (ZP) tones in phase tracking reference signals (PTRSs). As described herein, the introduction of ZP tones in PTRSs may make efficient use of system resources and, in some cases, allow for power boosting of other PTRS tones (e.g., non-zero power (NZP) tones).

For example, the operations described herein may be performed by a UE to transmit uplink (UL) PTRS and/or receive downlink (DL) PTRS. Similarly, the operations described herein may be performed on the network side (e.g., by a base station (BS) such as an eNB/gNB) to transmit DL PTRS and/or receive UL PTRS.

The following description provides examples of the techniques for introducing ZP tones in PTRSs, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G New Radio (NR)) wireless technologies, aspects of the present disclosure can be applied in other generation-based communication systems.

NR access may support various wireless communication services, such as enhanced mobile broadband (eMBB) targeting wide bandwidth, millimeter wave (mmW), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 megahertz (MHz)-7.125 gigahertz (GHz)) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple-input multiple-output (MIMO) transmissions with precoding may also be supported. MIMO configurations in the downlink (DL) may support up to 8 transmit antennas with multi-layer DL transmissions up to 8 streams and up to 2 streams per user equipment (UE). Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, wireless communication network 100 may include a UE, such as UE 120a (with a phase tracking reference signal (PTRS) manager 122) that may be configured to perform operations 900 of FIG. 9 and/or operations 1000 of FIG. 10. Similarly, wireless communication network 100 may include a network entity, such as base station (BS) 110a (with a PTRS manager 112) that may be configured to perform operations 900 of FIG. 9 and/or operations 1000 of FIG. 10.

As shown in FIG. 1, wireless communication network 100 may be in communication with a core network 132. Core network 132 may in communication with one or more BSs 110a-z (each also individually referred to herein as BS 110 or collectively as BSs 110) and/or UEs 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

BSs 110 communicate with UEs 120 in wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
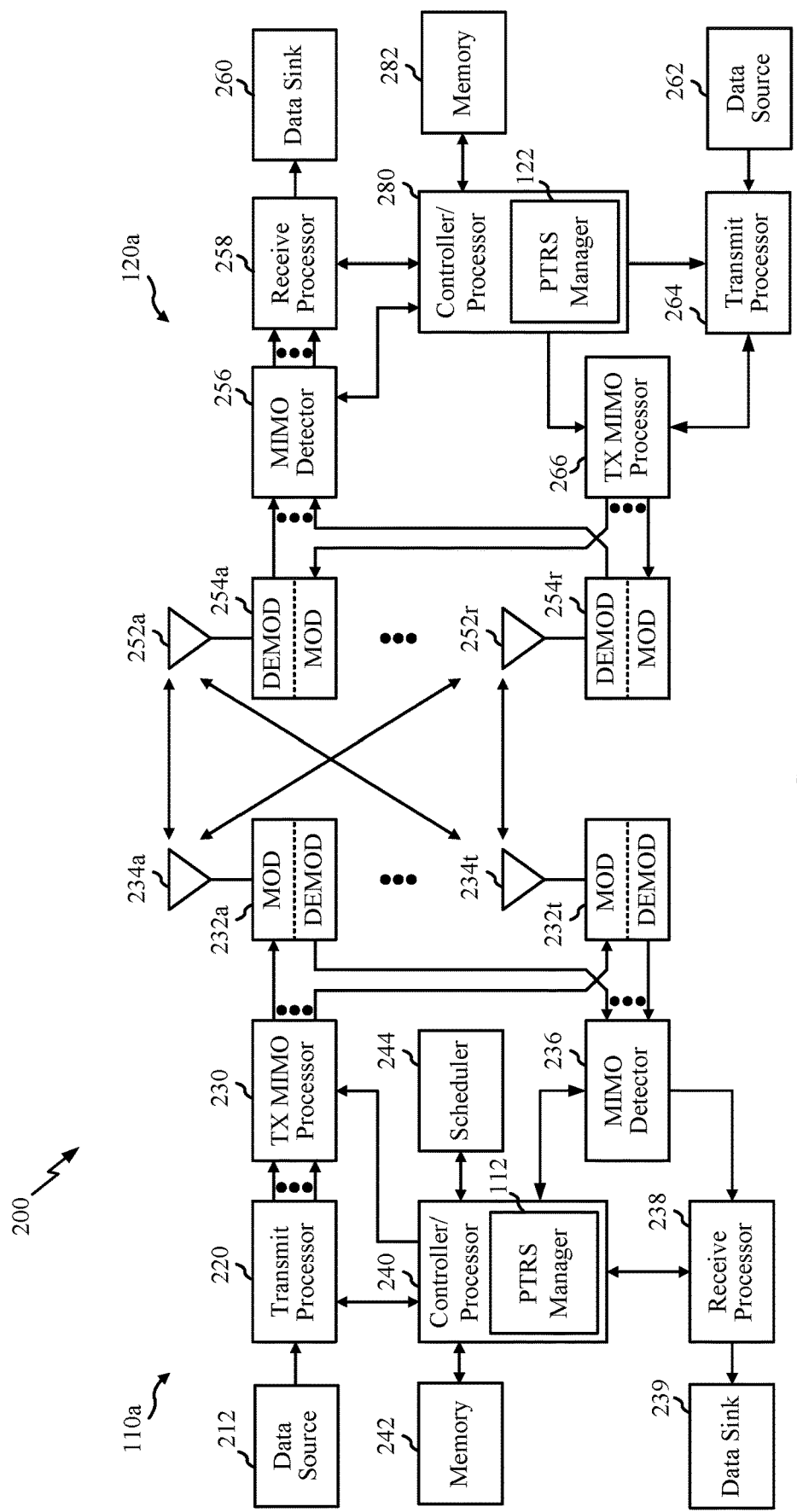
FIG. 2 is a block diagram conceptually illustrating example components of a network entity and a user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from the modulators in transceivers 232a-232t may be transmitted via antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by antennas 234, processed by the demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs 120 for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has a PTRS manager 112 that may be configured to perform operations 900 of FIG. 9 and/or operations 1000 of FIG. 10. Similarly, as shown in FIG. 2, controller/processor 280 of UE 120a has a PTRS manager 122 configured to perform operations 900 of FIG. 9 and/or operations 1000 of FIG. 10. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
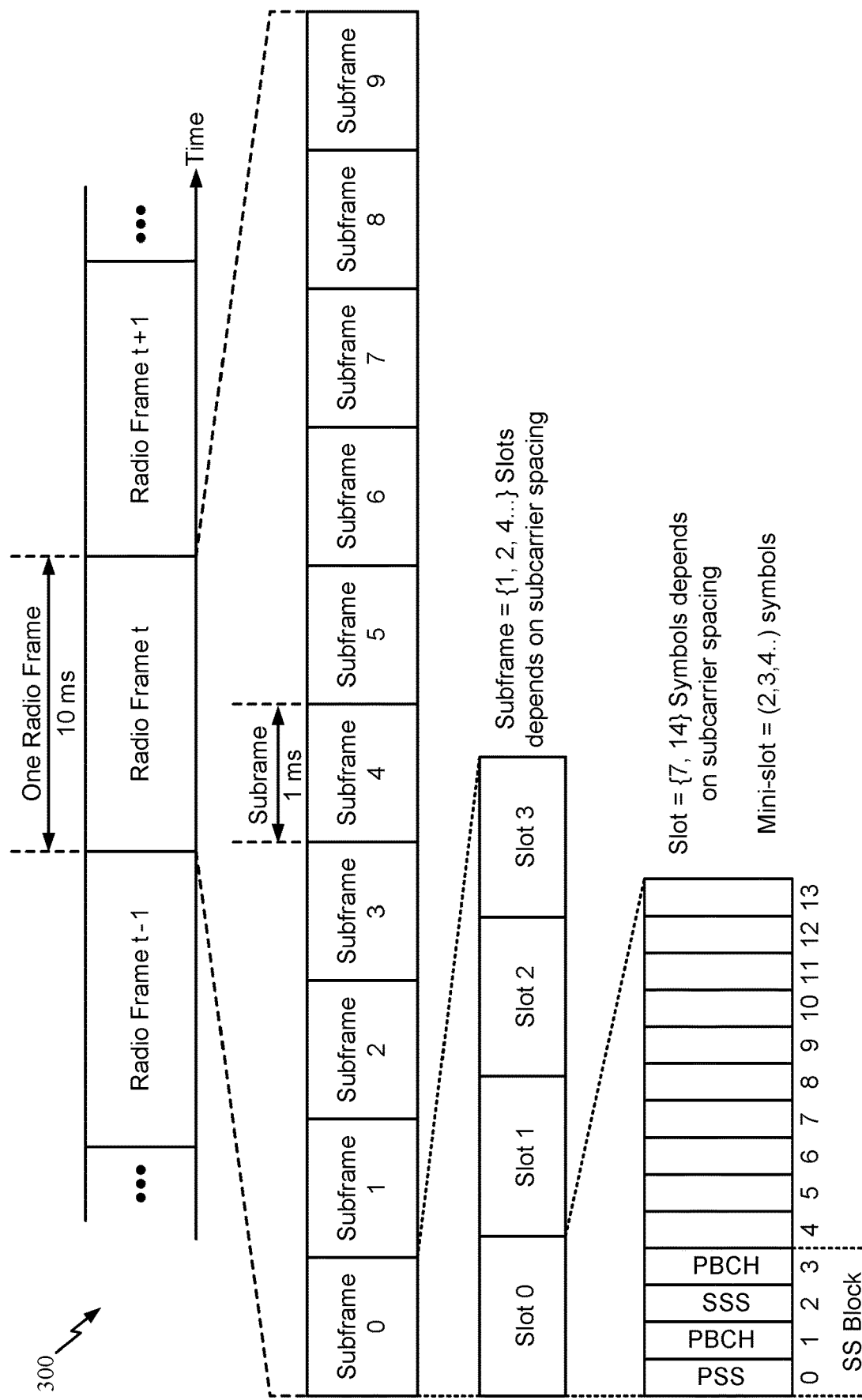
FIG. 3 is a block diagram illustrating an example of a frame format for a new radio (NR), in accordance with certain aspects of the present disclosure.

FIG. 3 is a diagram showing an example of a frame format 300 for NR, in accordance with certain aspects of the present disclosure. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a synchronization signal block (SSB) is transmitted. The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, and the SSS may provide CP length and frame timing. The PSS and the SSS may provide cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SSB can be transmitted up to sixty-four times, for example, with up to sixty-four different beam directions for mmW. The up to sixty-four transmissions of the SSB are referred to as the SS burst set. The SSBs in an SS burst set are transmitted in a same frequency region, while the SSBs in different SS bursts sets can be transmitted at different frequency locations.

Example Phase Tracking Reference Signal (PTRS) Design for Inter-Carrier Interference (ICI)

5G New Radio (NR) is a global 5G standard for a new orthogonal frequency division multiplex (OFDM)-based air interface designed to support the wide variation of 5G device-types, services, deployments, and spectrum. One transformation taking place with 5G NR is the move towards higher millimeter wave (mmWave) frequencies as an approach to significantly boost the capacity of 5G. However, mmWave devices and network access points (APs) suffer from severe phase noise (PN) (e.g., small random phase variations) due, at least in part, to the mismatch of transmitter and receiver frequency oscillators. Random PN and frequency offset are generated by non-ideal oscillators at both receiver and transmitter. In other words, PN is caused by noise in the active components and lossy elements which is up-converted to the carrier frequency.

As is known in the art, PN is a multiplicative process in the time domain which results in cyclic convolution of a physical downlink shared channel (PDSCH), with corresponding PN taps in a frequency domain. Uncompensated PN leads to common phase error (CPE) and inter-carrier interference (ICI) (also referred to as inter-symbol-interference) related error.

PN related ICI is prevalent in most high signal-to-noise ratio (SNR) regions which are associated with high modulation and coding scheme (MCS) options and high modulation orders. ICI taps (also referred to as ICI sequences) represent the frequency domain PN response. ICI taps/sequences may be different per symbol, but are the same for all resource elements (REs). Further, ICIs taps/sequences are typically the same for all receive (RX)/transmit (TX) antennas.

In this regard, phase tracking reference signals (PTRSs) were introduced as PN mitigation pilots in 3rd Generation Partnership Project (3GPP) Release 15. In particular, PTRSs may track a phase of an oscillator at a transmitter and a receiver of a node and mitigate the performance loss due to the PN. The terms PTRSs and PTRS tones may be used interchangeably herein.

For example, in some wireless communication systems having a UE and a base station (BS), the BS may have a good phase coherence across its one or more antenna ports. The UE UL transmission with two or more oscillators may be full-coherent, partial-coherent, or non-coherent in phase. In such wireless communication systems, PTRSs may be used for PN estimation. The PTRSs may track a phase of an oscillator at a transmitter and a receiver of the UE. The phase tracking may enable suppression of PN impacts, such as CPE, particularly at higher (e.g., mmWave) frequencies.

Figure 4:
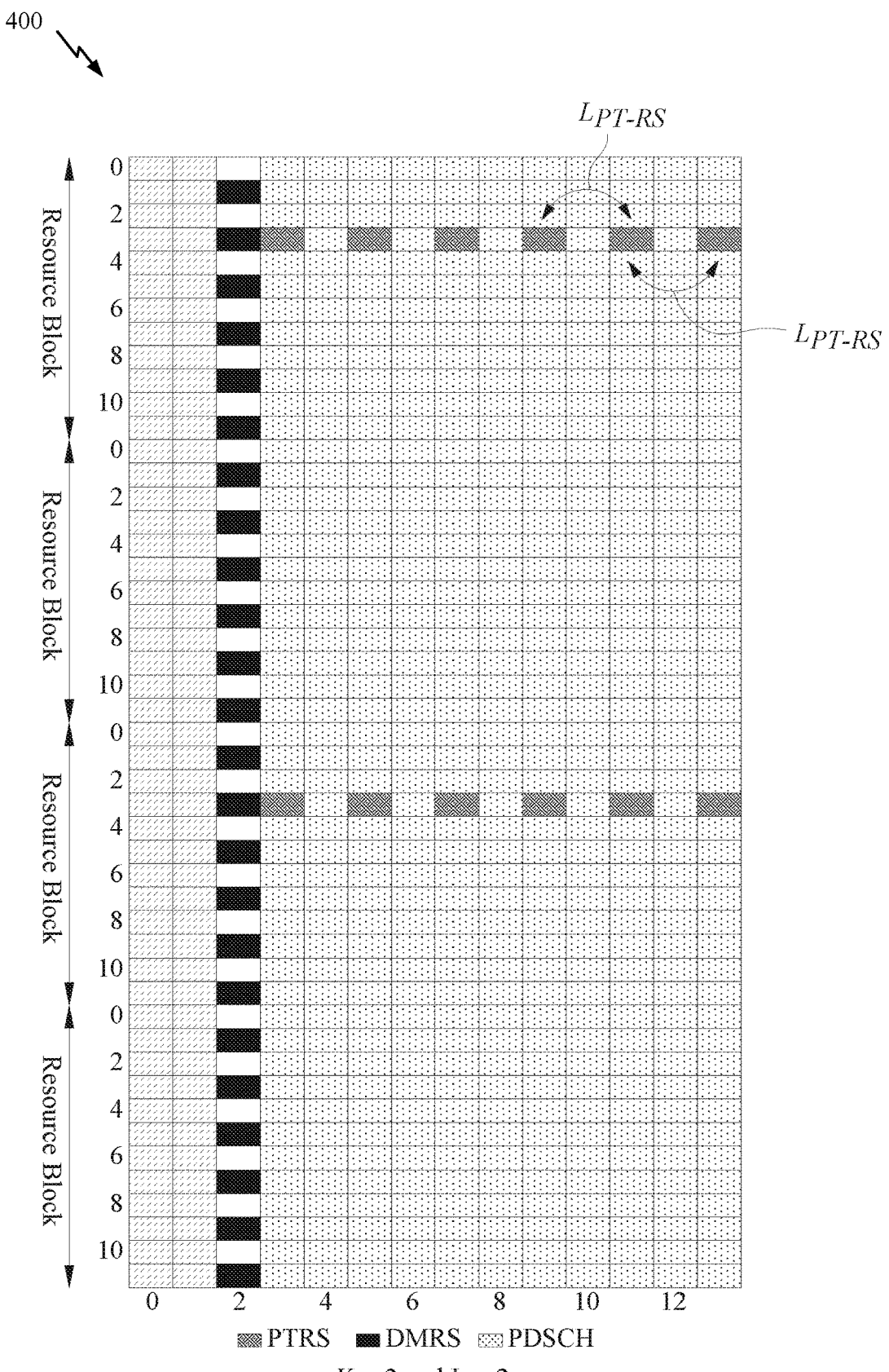
FIG. 4 illustrates example phase tracking reference signal (PTRS) tones in a resource block (RB), in accordance with certain aspects of the present disclosure.

In 3GPP Release 16 5G NR, the PTRS may be present in a resource block (RB). FIG. 4 illustrates an example 400 of PTRS tones in an RB, in accordance with certain aspects of the present disclosure. As shown in FIG. 4, with a TimeDensity, $L_{PT-RS}$ (also referred to as parameter L), of two, one PTRS tone is sent every two symbols, and with a FrequencyDensity, $K_{PT-RS}$ (also referred to as parameter K), of two, one PTRS tone is sent every two RBs.

Time domain and frequency domain resources for the PTRSs (e.g., PTRS tones) may be dynamically determined. For example, for single user multiple-input multiple-output (SU-MIMO), radio resource control (RRC) signaling may provide predefined configurations for the PTRS based on a TimeDensity ($L_{PT-RS}$) and FrequencyDensity ($K_{PT-RS}$), which may be specified by parameters L and K, respectively. The signaling may be provided via PTRS-DownlinkConfig and PTRS-UplinkConfig. For example, the time density may be associated with and determined by a scheduled modulation and coding scheme (MCS), while the frequency density may be associated with and determined by a scheduled bandwidth (e.g., in number of RBs).

FIG. 5 illustrates an example table of time density parameters for PTRSs, in accordance with certain aspects of the present disclosure. As shown in Table 500 of FIG. 5, the time density of a PTRS may be determined as a function of scheduled MCS. In particular, TimeDensity, parameter L, may indicate threshold values ptrs-MCSi, i=1, 2, 3, 4 as illustrated in table 500 of FIG. 5. For cyclic prefix OFDM (CP-OFDM), TimeDensity, parameter L, may include every symbol, every second symbol, or every fourth symbol, and more specifically, TimeDensity, parameter L, may be equal to one, two, or four. When L equals one, PTRS tones are sent on every physical downlink shared channel (PDSCH) symbol. When L equals two, PTRS tones are sent on one symbol for every two PDSCH symbols. When L equals four, PTRS tones are sent on one symbol for every four PDSCH symbols. As the scheduled MCS increases, the time density of the PTRS is expected to increase, as well.

FIG. 6 illustrates an example table of frequency density parameters for PTRSs, in accordance with certain aspects of the present disclosure. As shown in Table 600 of FIG. 6, the frequency density of PTRS may be determined as a function of scheduled bandwidth (e.g., in number of RBs). In particular, frequencyDensity, parameter K, may indicate scheduled bandwidth threshold values NRB,i, i=0,1 as illustrated in Table 600 of FIG. 6. For CP-OFDM, FrequencyDensity, parameter K, may include may include occupying at least one subcarrier in every second RB or every fourth RB, and more specifically, FrequencyDensity, parameter K, may be equal to two or four. When K equals two, PTRS tones are sent every 2 RBs. When K equals four, PTRS tones are sent every 4 RBs. In other words, the frequency density may include occupying at least one subcarrier in every RB, every second RB, or every fourth RB. The subcarrier may not necessarily be in all REs; however, this is dependent upon the corresponding time density. As the scheduled bandwidth increases, the time density of the PTRS is expected to decrease.

Figure 7:
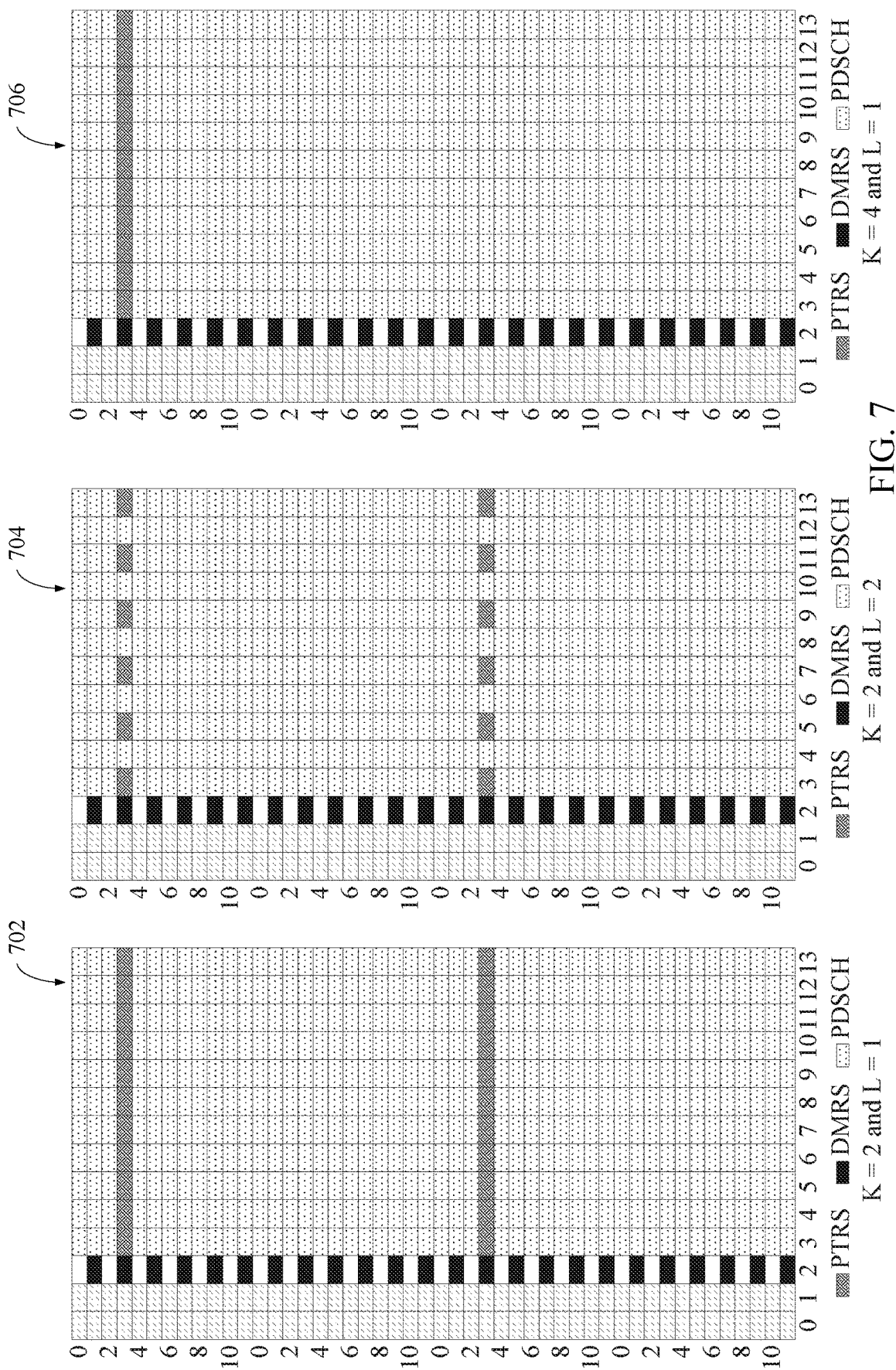
FIG. 7 illustrates example PTRS tone patterns in an RB, in accordance with certain aspects of the present disclosure.

FIG. 7 illustrates example (isolated) PTRS patterns in the frequency domain, in accordance with current NR configurations for PTRS, in accordance with certain aspects of the present disclosure. The PTRS tones may be sent according to parameters, such as timeDensity ($L_{PT\text{-}RS}$) and frequencyDensity (1/n), which may be specified by parameters L and K, respectively.

$$\left\| \begin{bmatrix} H_{k_0+2u}S_{k_0+2u} & H_{k_0+2u-1}S_{k_0+2u-1} & \cdots & H_{k_0}S_{k_0} \\ H_{k_0+2u+1}S_{k_0+2u+1} & H_{k_0+2u}S_{k_0+2u} & \cdots & H_{k_0+1}S_{k_0+1} \\ \vdots & \vdots & \ddots & \vdots \\ H_{k_0+M-1}S_{k_0+M-1} & H_{k_0+M-2}S_{k_0+M-2} & \cdots & H_{k_0+M-2u-1}S_{k_0+M-2u-1} \end{bmatrix} \begin{bmatrix} b_{-u} \\ b_{-u+1} \\ \vdots \\ b_u \end{bmatrix} - \begin{bmatrix} R_{k_0+u} \\ R_{k_0+u+1} \\ \vdots \\ R_{k_0+M-u-1} \end{bmatrix} \right\|^2 \triangleq \|X_u b_u - r_u\|^2$$

As mentioned, TimeDensity, parameter L, may be equal to one, two, or four. Further, FrequencyDensity, parameter K, may be equal to two or four.

For example, as shown in example PTRS pattern 702, with a frequencyDensity, K, of 2 and a timeDensity, L, of 1, one PTRS tone is sent every two RBs and PTRS tones are sent on every PDSCH, respectively. Further, in the example PTRS pattern 704, with a frequencyDensity, K, of 2 and a timeDensity, L, of 2, one PTRS tone is sent every two RBs and PTRS tones are sent on one symbol for every two PDSCH symbols, respectively. Further, in example PTRS pattern 706, with a frequencyDensity, K, of 4 and a timeDensity, L, of 1, one PTRS tone is sent every four RBs and PTRS tones are sent on every PDSCH, respectively.

When the PTRS tones are uniformly distributed over the frequency domain, the PTRSs have a good frequency diversity.

ICI is an impairment well known to degrade performance of OFDM transmissions. ICI arises from carrier frequency offsets (CFOs), from the Doppler spread due to channel time-variation and, to a lesser extent, from sampling frequency offsets (SFOs). Thus, it is essential that the PTRS pattern capture the ICI impact. Unlike the current NR configurations for PTRS, clustered PTRSs have contiguous sets of PTRS tones in the frequency domain which may be better suited for capturing the ICI impact.

Figure 8:
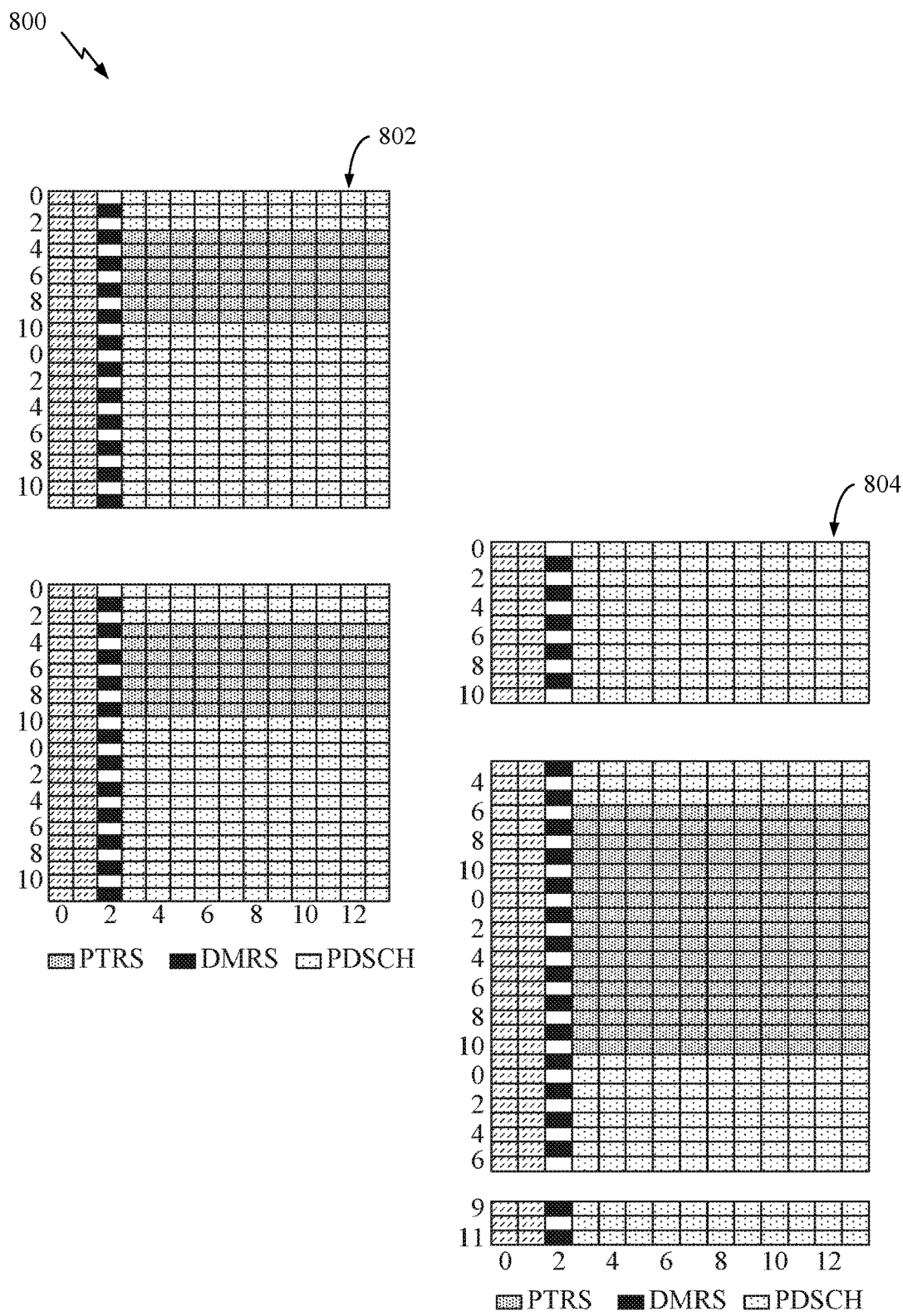
FIG. 8 illustrates example clustered PTRS patterns, in accordance with certain aspects of the present disclosure.

FIG. 8 illustrates example subcarriers in an RB containing clustered PTRS patterns in the frequency domain, in accordance with certain aspects of the present disclosure. In an RB, there may be a single PTRS cluster or several PTRS clusters, each having a number of contiguous PTRS tones. For example, as shown at 802, multiple clusters may be present, whereas, as shown at 804, only a single cluster may be present.

Although clustered PTRS patterns may better capture ICI impact, clustered PTRSs may be subject to undesirable, frequency selective fading.

Generally, the presence of PN in an OFDM system introduces ICI at the subcarrier level of the received signal. The strength of the ICI is a function of the received signal strength and the PN variance. Further, based on the PN, an ICI filter may be approximated for use in filtering the signal. The PTRS design may support estimating the ICI. For example, PTRSs are transmitted on sub-carriers $k_0$, $k_0+1, \ldots, k_0+M-1$ (i.e., for a block of M contiguous PTRS tones, the values on $S_k$ at these sub-carriers are known). ICI can be approximated, and an ICI filter can be used, to filter the signal to improve performance. First, the ICI filter induced by PN may be estimated, then the estimated filter may be used to filter the signal.

A 2u+1-tap filter may be estimated such that:

$$\sum_{m=-u}^{u} b_m H_{k-m} S_{k-m} \approx R_k \text{ for } k \in \{k_0+u, k_0+u+1, \cdots, k_0+M-u-1\}$$

The estimated filter coefficients can be obtained from minimizing the following residue sum of squares:

The least squares problem has a solution given by $$\hat{b}_u = (X_u^H X_u)^{-1} X_u^H r_u$$

Further, the received signals are filtered by $\{b\hat{\;}\_u\hat{\;}{*}, b\hat{\;}\_(u-1)\hat{\;}{*}, b\hat{\;}\_(-u)\hat{\;}{*}\}$ and fed to the OFDM demodulator. The OFDM demodulator may use the estimated filter to filter the signal.

Aspects of the present disclosure provide improved techniques and apparatuses for altering the PTRS design to estimate filter coefficients for an ICI filter. Additionally, further clarification regarding techniques and apparatuses for addressing instances involving collisions between an RB and a direct current (DC) tone are desired.

Example Phase Tracking Reference Signals (PTRSs) with Zero Power (ZP) Tones

As mentioned above, aspects of the present disclosure relate generally to improved techniques for efficiently using phase tracking reference signals (PTRSs). In some systems, a user equipment (UE) or base station (BS) (e.g., gNB) may estimate filter coefficients for an inter-carrier interference (ICI) filter utilizing a PTRS with zero power (ZP) tones (i.e., using a PTRS without using a certain number of PTRS tones in the PTRS).

For example, to estimate filter coefficients using the aforementioned filter implementation, the UE or BS may estimate filter coefficients without a first and last u received PTRS tones, from each PTRS block, (e.g., where edge u PTRS tones from each PTRS block are designated as ZP tones) contributing to the estimation. Estimating filter coefficients for the ICI filter based on the PTRS received on the non-zero power (NZP) tones, with power boosting applied to the NZP tones within a block structure of the PTRS, may lead to better coefficient estimation.

Figure 9:
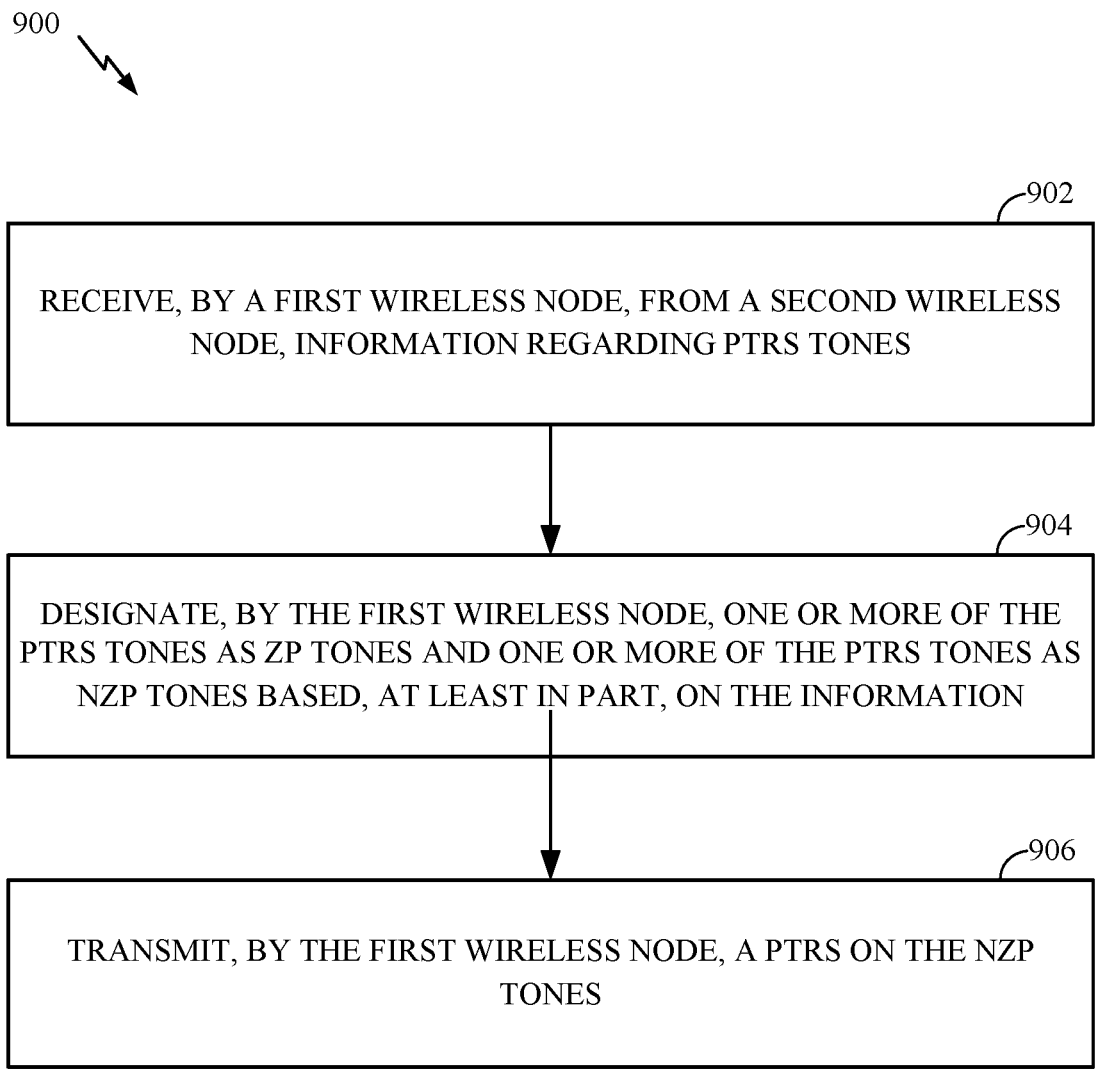
FIG. 9 is a flow diagram illustrating example operations for wireless communication by a first wireless node for transmitting PTRS with ZP tones, in accordance with certain aspects of the present disclosure.

FIG. 9 is a flow diagram illustrating example operations 900 for wireless communication by a first wireless node, in accordance with certain aspects of the present disclosure. Operations 900 may be performed, for example, by a UE (e.g., such as UE 120a in wireless communication network 100) to transmit uplink PTRS or by a network entity (e.g., such as BS 110a in wireless communication network 100) to transmit downlink PTRS.

Operations 900 may be implemented as software components that are executed and run on one or more processors (e.g., controller/processor 280 or controller/processor 240 of FIG. 2). Further, the transmission and reception of signals by the first wireless node in operations 900 may be enabled, for example, by one or more antennas (e.g., antennas 252 or antennas 234 of FIG. 2). In certain aspects, the transmission and/or reception of signals by the first wireless node may be implemented via a bus interface of one or more processors (e.g., controller/processor 280 or controller/processor 240) obtaining and/or outputting signals.

Operations 900 begin, at block 902, by the first wireless node, receiving, from a second wireless node, information regarding PTRS tones. In some cases, the first wireless node is a UE and the second wireless node is a network entity. In some other cases, the first wireless node is a network entity and the second wireless node is a UE.

At block 904, the first wireless node designates one or more of the PTRS tones as ZP tones and one or more of the PTRS tones as NZP tones based, at least in part, on the information. For example, in some cases, the information may indicate filter parameters (e.g., filter length) that may be used to determine a number of PTRS tones to designate as ZP tones (with the remaining tones designated as NZP tones).

At block 906, the first wireless node transmits a PTRS on the NZP tones. In some cases, given PTRS is not transmitted on ZP tones, the power of PTRSs transmitted on the NZP tones may be boosted accordingly. In cases, where the first wireless node is a UE and the second wireless node is a network entity, the PTRS may be an uplink (UL) PTRS. In some other cases, where the first wireless node is a network entity and the second wireless node is a UE, the transmitted PTRS may be a downlink (DL) PTRS.

Figure 10:
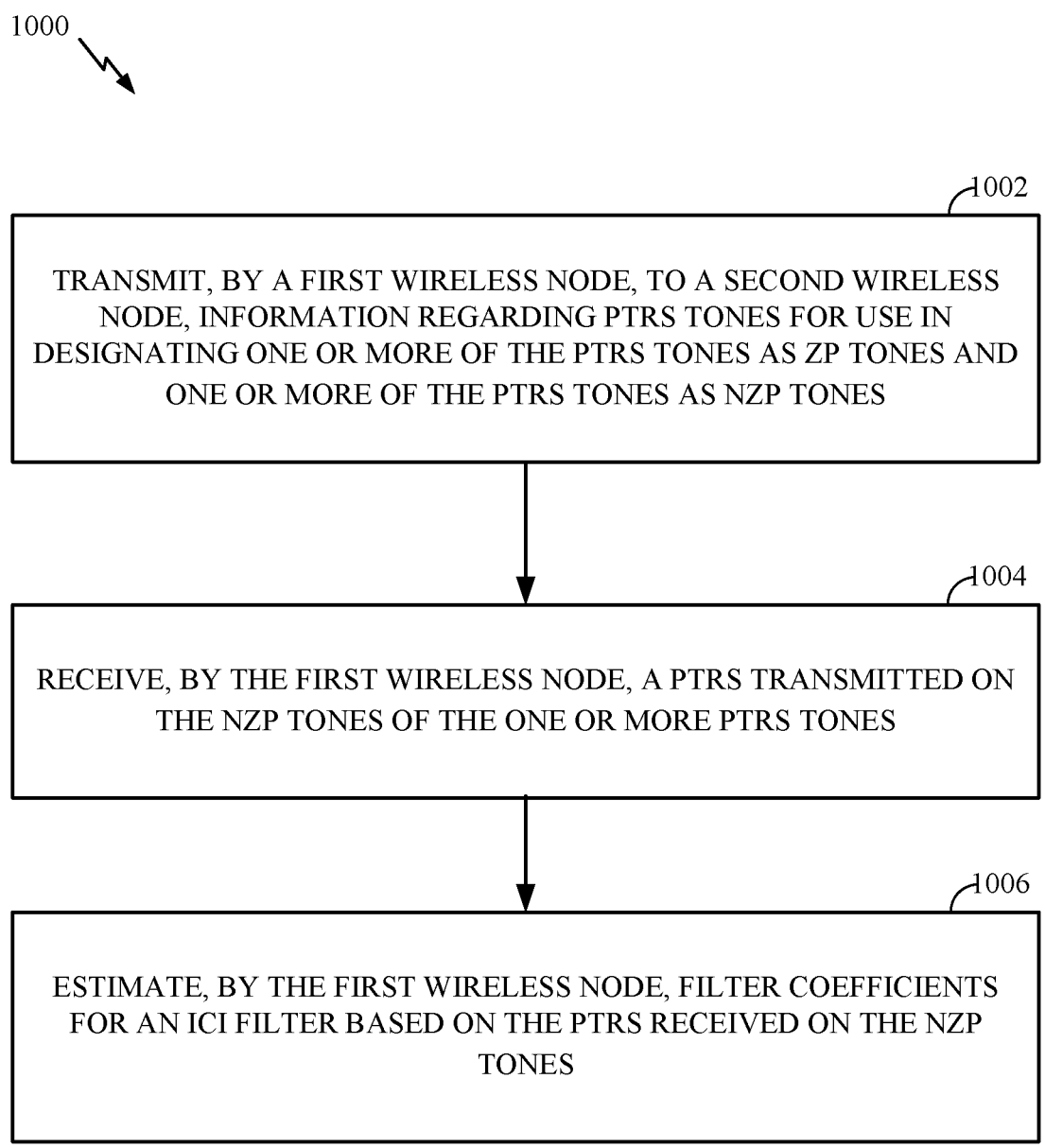
FIG. 10 is a flow diagram illustrating example operations for wireless communication by a first wireless node for receiving PTRS with ZP tones, in accordance with certain aspects of the present disclosure.

FIG. 10 is a flow diagram illustrating example operations 1000 for wireless communication by a first wireless node, in accordance with certain aspects of the present disclosure. Operations 1000 may be considered complementary to operations 900 of FIG. 9. For example, in some cases, operations 1000 may be performed by a network entity to receive and process UL PTRS sent by a UE (in accordance with operations 900 of FIG. 9) or by a UE to receive and process DL PTRS sent by a network entity (in accordance with operations 900 of FIG. 9).

Operations 1000 may be implemented as software components that are executed and run on one or more processors (e.g., controller/processor 240 or controller/process 280 of FIG. 2). Further, the transmission and reception of signals by the BS in operations 1000 may be enabled, for example, by one or more antennas (e.g., antennas 234 or antennas 252 of FIG. 2). In certain aspects, the transmission and/or reception of signals by the network entity may be implemented via a bus interface of one or more processors (e.g., controller/processor 240 or controller/processor 280) obtaining and/or outputting signals.

Operations 1000 begin, at block 1002, by the first wireless node, transmitting, to a second wireless node, information regarding PTRS tones for use in designating one or more of the PTRS tones as ZP tones and NZP tones. In some cases, the first wireless node is a UE and the second wireless node is a network entity. In some other cases, the first wireless node is a network entity and the second wireless node is a UE.

At block 1004, first wireless node receives PTRS transmitted on the NZP tones of the one or more PTRS tones. At block 1006, the first wireless node estimates filter coefficients for the ICI filter based on the PTRS received on the NZP tones.

Figure 11:
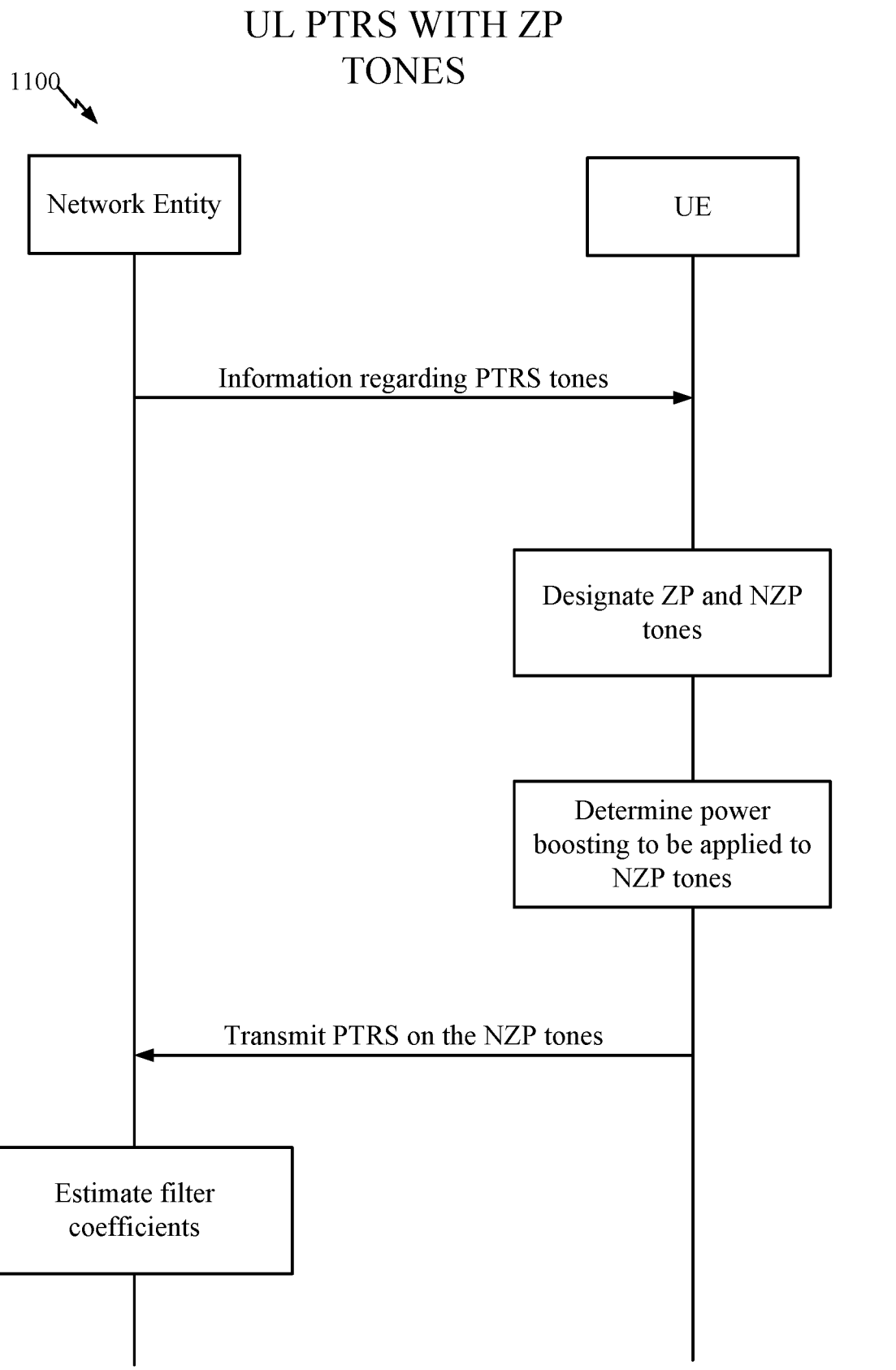
FIG. 11 is a call flow diagram illustrating a non-limiting example which supports introducing ZP tones in UL PTRS, in accordance with certain aspects of the present disclosure.
Figure 12:
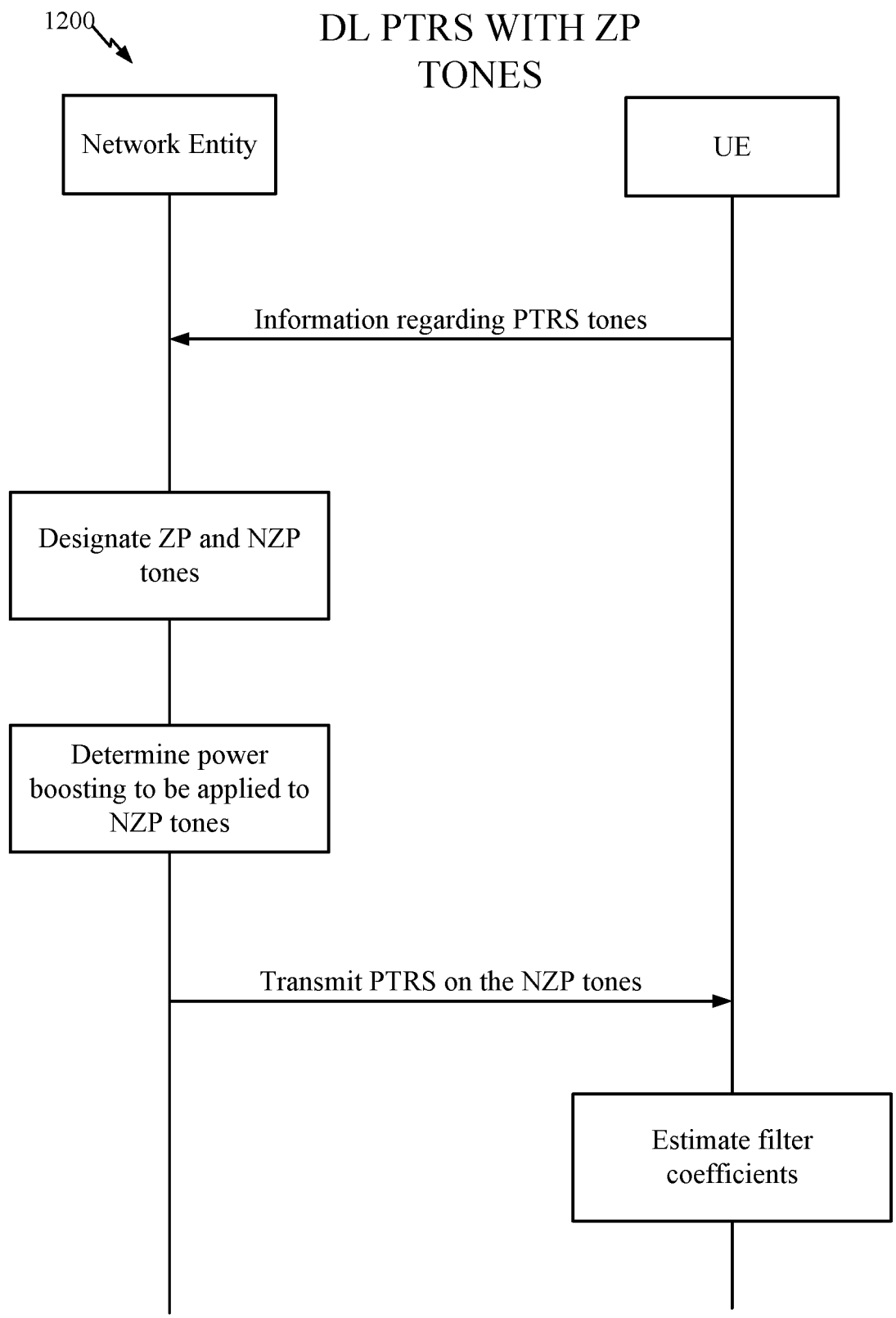
FIG. 12 is a call flow diagram illustrating a non-limiting example which supports introducing ZP tones in DL PTRS, in accordance with certain aspects of the present disclosure.

Operations 900 and 1000 of FIGS. 9 and 10, respectively, may be understood with reference to call flow diagrams 1100 and 1200 of FIGS. 11 and 12, respectively, that show an example of a first wireless node transmitting PTRS (e.g., UL PTRS where the PTRS is transmitted by a UE and DL PTRS where the PTRA is transmitted by a network entity (e.g., BS)) with NZP tones, in accordance with certain aspects of the present disclosure.

FIG. 11 is a call flow diagram 1100 illustrating a non-limiting example which supports introducing ZP tones in UL PTRS, in accordance with certain aspects of the present disclosure. As shown in FIG. 11, a network entity (e.g., a gNB) may transmit (and a UE may receive) information regarding PTRS tones. For example, the information may include an ICI filter containing a filter type and/or a filter length. The information may be transmitted via radio resource configuration (RRC) signaling of a PTRS recommendation.

In some cases, the information indicates a number of the PTRS tones to designate as the ZP tones. In some examples, the number comprises a fraction of a total number of the PTRS tones.

Based on the filter information, the UE may designate one or more of the PTRS tones as ZP tones and one or more of the PTRS tones as NZP tones (e.g., designate each of the PTRS tones as either ZP tones or NZP tones). In some examples, the UE may designate the edge u PTRS tones from each PTRS block (e.g., a block structure of the PTRS) as ZP tones. In other words, the UE may designate a PTRS tone (or multiple PTRS tones) on one edge of the PTRS block as a ZP tone (or ZP tones) and designate a PTRS tone (or multiple PTRS tones) on the other edge of the PTRS block as a ZP tone (or ZP tones). In some examples, the UE may designate ZP tones based on a predefined pattern (e.g., hardcoded) in the specification indicating which of the PTRS tones should be designated as ZP tones. In some examples, the UE may designate ZP tones by making a choice between some predefined choices.

Accordingly, remaining tones, of the PTRS tones, not designated as ZP tones may be designated by the UE as NZP tones.

As mentioned above, in some cases, the UE may apply power boosting to the designated NZP tones, based on the number of designated ZP tones. For example, the UE may determine a total power of the PTRS prior to designating one or more of the PTRS tones as ZP tones. The UE may apply power boosting to the designated NZP tones when transmitting PTRS on the NZP tones in a manner designed to maintain this total power.

Further, the UE may transmit the PTRS, to the network entity, on the designated NZP tones, and in some cases, with the power boosting applied. Based on measurement of the PTRS on the NZP tones, the network entity may estimate filter coefficients for the ICI filter.

Although clustered PTRS patterns may capture the ICI impact better, frequency diversity may be deficient. For this reason, frequency hopping may be applied to PTRS tones across different symbols to create diversity. Thus, in some examples, the UE may apply frequency hopping on PTRS tones across different symbols. The frequency hopping may be based either on a predefined hopping pattern (e.g., hardcoded in the specification) or a hopping pattern signaled via RRC signaling. Accordingly, the UE may determine an amount of power boosting to be applied to each of the NZP tones on each of the different symbols. The UE may make this determination based on a number of designated ZP tones in each of the symbols.

In some examples, instances involving collisions between a resource block (RB) and a direct current (DC) tone may be unavoidable. Where the UE detects that the PTRS has collided with an RB of a DC tone, then the UE may act in one of four different ways. The UE may either (1) divide the PTRS into at least two sub-blocks, each with a contiguous set of tones, (2) shift the PTRS by a configured or hardcoded offset, (3) skip transmission of the entire PTRS, or (4) skip transmission of at least a subset of tones from the PTRS and power boost the remaining tones to be transmitted (e.g., adjust the power boosting based on the skipped subset of tones).

Where the UE divides the PTRS into at least two sub-blocks, each with a contiguous set of tones, further use of the two sub-blocks may be determined based on the size of each of the two sub-blocks. Where the size of either of the two sub-blocks is equal to or below a reported filter length, then the UE may determine the sub-block is useless for ICI filter estimation (i.e., at least a set of contiguous 2u+1 tones are needed for a filter length of 2u+1 or the sub-block is determined to be useless for ICI filter estimation). Accordingly, the UE may skip transmission of the PTRS for that sub-block and adjust power boosting for the remaining tones of the other sub-block.

While the description of FIG. 11 refers to an example of UL PTRS using ZP tones, ZP tones may also be used for downlink (DL) PTRS.

FIG. 12 is a call flow diagram 1200 illustrating a non-limiting example which supports introducing ZP tones in DL PTRS, in accordance with certain aspects of the present disclosure. As shown in FIG. 12, a network entity (e.g., a gNB) may receive (and a UE may transmit) information regarding PTRS tones. For example, the information may include an ICI filter containing a filter type and/or a filter length. The information may be transmitted via RRC signaling of a PTRS recommendation.

In some cases, the information indicates a number of the PTRS tones to designate as the ZP tones. In some examples, the number comprises a fraction of a total number of the PTRS tones.

Based on the filter information, the network entity may designate one or more of the PTRS tones as ZP tones and one or more of the PTRS tones as NZP tones (e.g., designate each of the PTRS tones as either ZP tones or NZP tones). In some examples, the network entity may designate the edge u PTRS tones from each PTRS block as ZP tones. In other words, the network entity may designate a PTRS tone (or multiple PTRS tones) on one edge of the PTRS block as a ZP tone (or ZP tones) and designate a PTRS tone (or multiple PTRS tones) on the other edge of the PTRS block as a ZP tone (or ZP tones). In some examples, the network entity may designate ZP tones based on a predefined pattern (e.g., hardcoded) in the specification indicating which of the PTRS tones should be designated as ZP tones. In some examples, the network entity may designate ZP tones by making a choice between some predefined choices.

Accordingly, remaining tones, of the PTRS tones, not designated as ZP tones may be designated by the network entity as NZP tones.

In some cases, the network entity may power boost the designated NZP tones based on the number of designated ZP tones. For example, the network entity may determine a total power of the PTRS prior to designating one or more of the PTRS tones as ZP tones. To maintain this total power after designating one or more of the PTRS tones as ZP tones, the network entity may apply power boosting to the designated NZP tones.

Further, the network entity may transmit, to the UE, a PTRS on the designated NZP tones. In some examples, the UE may apply the determined power boosting when transmitting the PTRS on the NZP tones.

Subsequent to receiving the PTRS on the NZP tones, the UE may estimate filter coefficients for the ICI filter. The estimation may be based on the PTRS received on the NZP tones.

For the reasons identified above, in some cases, frequency hopping may be applied to PTRS tones across different symbols to create diversity. Thus, in some examples, a network entity, such as the network entity illustrated in FIG. 12, may apply frequency hopping on PTRS tones across different symbols. The frequency hopping may be based either on a predefined hopping pattern (e.g., hardcoded in the specification) or a hopping pattern signaled via RRC signaling. Accordingly, the first wireless node may determine an amount of power boosting to be applied to each of the NZP tones on each of the different symbols. The first wireless node may make this determination based on a number of designated ZP tones in each of the symbols.

As identified above, instances involving collisions between an RB and a DC tone may be unavoidable. Where a network entity, such as the network entity illustrated in FIG. 12, detects that the PTRS has collided with an RB of a DC tone, then the network Entity may act in one of four different ways. The network entity may either (1) divide the PTRS into at least two sub-blocks, each with a contiguous set of tones, (2) shift the PTRS by a configured or hardcoded offset, (3) skip transmission of the entire PTRS, or (4) skip transmission of at least a subset of tones from the PTRS and power boost the remaining tones to be transmitted.

Where the network entity divides the PTRS into at least two sub-blocks, each with a contiguous set of tones, further use of the two sub-blocks may be determined based on the size of each of the two sub-blocks. Where the size of either of the two sub-blocks is equal to or below a reported filter length, then the network entity may determine the sub-block is useless for ICI filter estimation (i.e., at least a set of contiguous 2u+1 tones are needed for a filter length of 2u+1 or the sub-block is determined to be useless for ICI filter estimation). Accordingly, the network entity may skip transmission of the PTRS for that sub-block and adjust power boosting for the remaining tones of the other sub-block.

Example Wireless Communication Device

Figure 13:
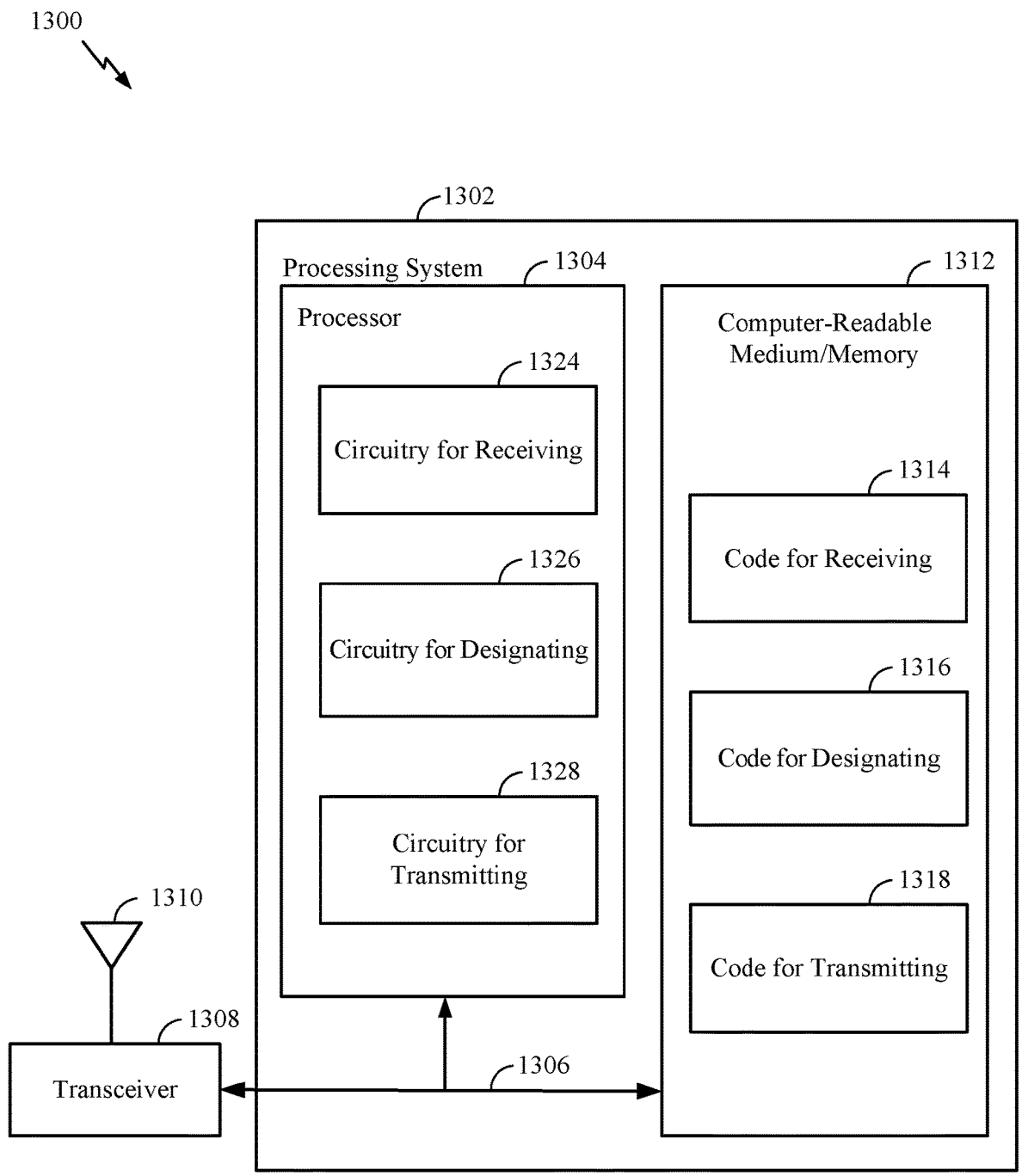
FIG. 13 illustrates a communications device that may include various components configured to perform operations for techniques disclosed herein, in accordance with aspects of the present disclosure.

FIG. 13 illustrates a communications device 1300 that may include various components (e.g., corresponding to means-plus-function components) operable, configured, or adapted to perform operations for the techniques disclosed herein, such as the operations described with respect to FIG. 9. In some examples, communications device 1500 may be a first wireless node, such as a user equipment (UE) (e.g., UE 120*a* described with respect to FIGS. 1 and 2) or a network entity (e.g., BS 110*a* described with respect to FIGS. 1 and 2).

Communications device 1300 includes a processing system 1302 coupled to a transceiver 1308 (e.g., a transmitter and/or a receiver). Transceiver 1308 is configured to transmit and receive signals for communications device 1300 via an antenna 1310, such as the various signals as described herein. Processing system 1302 may be configured to perform processing functions for communications device 1300, including processing signals received and/or to be transmitted by the communications device 1300.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations illustrated in FIG. 9, or other operations for performing the various techniques discussed herein for PTRSs.

In certain aspects, computer-readable medium/memory 1312 stores code 1314 (an example means for) for receiving (e.g., for receiving, from a network entity, information regarding phase tracking reference signal (PTRS) tones); code 1316 (an example means for) for designating (e.g., for designating one or more of the PTRS tones as zero power (ZP) tones and one or more of the PTRS tones as non-ZP (NZP) tones based, at least in part, on the information); and code 1318 (an example means for) for transmitting (e.g., for transmitting a PTRS on the NZP tones).

In certain aspects, processor 1304 has circuitry configured to implement the code stored in computer-readable medium/memory 1312. Processor 1304 includes circuitry 1324 (an example means for) for receiving (e.g., for receiving, from a network entity, information regarding PTRS tones); circuitry 1326 (an example means for) for designating (e.g., for designating one or more of the PTRS tones as ZP tones and one or more of the PTRS tones as NZP tones based, at least in part, on the information); and circuitry 1328 (an example means for) for transmitting a PTRS on the NZP tones, etc.

In some cases, the operations illustrated in FIG. 9, as well as other operations described herein, may be implemented by one or more means-plus-function components. For example, in some cases, such operations may be implemented by means for receiving, means for designating, and means for transmitting.

In some cases, means for designating, includes a processing system, which may include one or more processors, such as receive processor 258, transmit processor 264, TX MIMO processor 266, and/or the controller/processor 280 of UE 120a illustrated in FIG. 2 and/or processing system 1302 of communications device 1300 in FIG. 13. In some cases, means for designating, includes a processing system, which may include one or more processors, such as receive processor 238, transmit processor 220, TX MIMO processor 230, and/or the controller/processor 240 of BS 110a illustrated in FIG. 2 and/or processing system 1302 of communications device 1300 in FIG. 13.

Transceiver 1308 may provide a means for receiving or transmitting information. Information may be passed on to other components of communications device 1300. Antenna 1310 may correspond to a single antenna or a set of antennas. Transceiver 1308 may provide means for transmitting signals generated by other components of communications device 1300.

In some cases, means for receiving or means for obtaining may include a receiver (such as receive processor 258) or antenna(s) 252 of UE 120a illustrated in FIG. 2. In some cases, means for receiving or means for obtaining may include a receiver (such as receive processor 238) or antenna(s) 234 of BS 110a illustrated in FIG. 2.

In some cases, means for transmitting or means for outputting may include a transmitter (such as the transmit processor 264) or antenna(s) 252 of UE 120a illustrated in FIG. 2. In some cases, means for transmitting or means for outputting may include a transmitter (such as the transmit processor 220) or antenna(s) 234 of BS 110a illustrated in FIG. 2.

Notably, FIG. 13 is just use one example, and many other examples and configurations of communications device 1300 are possible.

Figure 14:
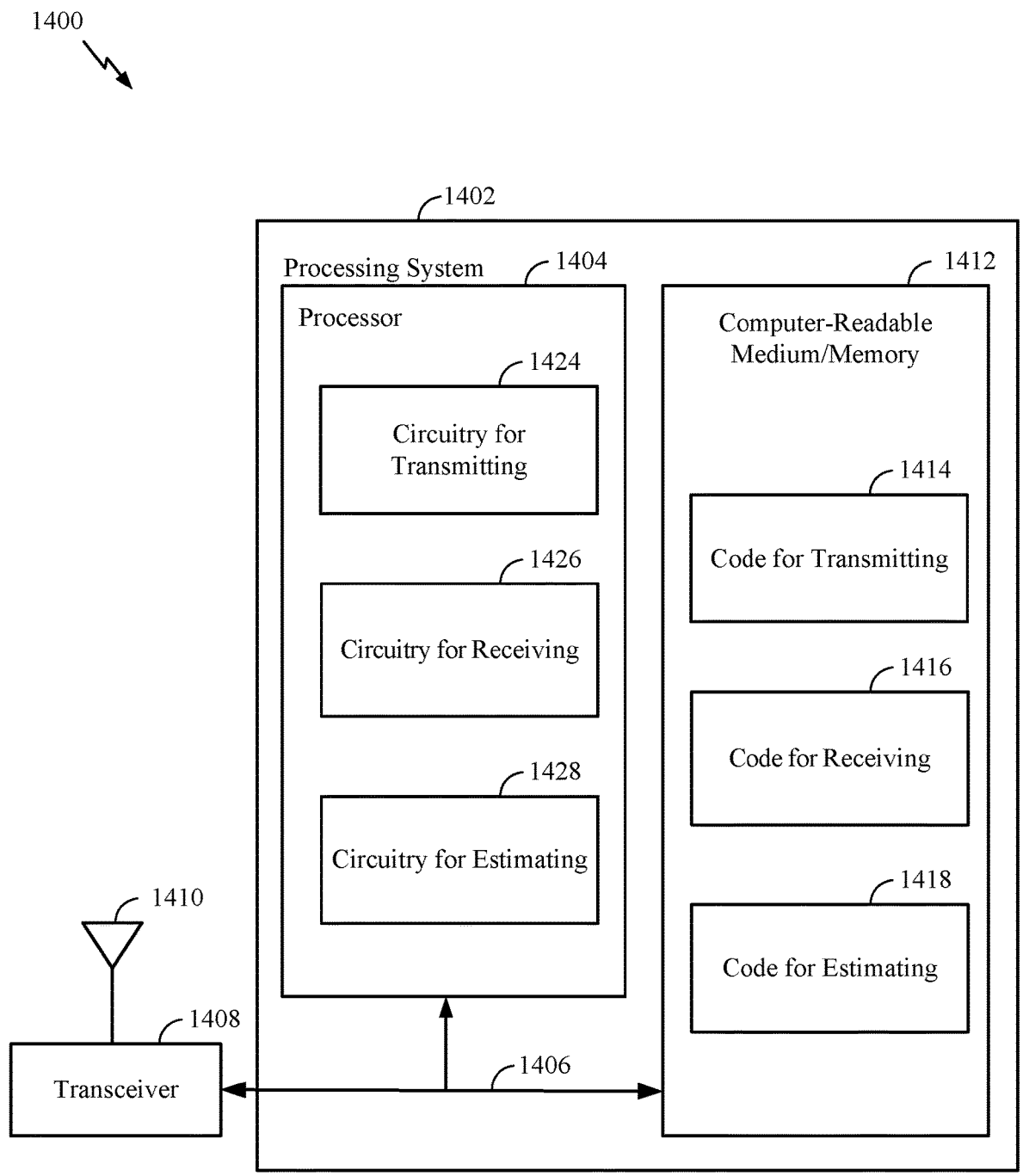
FIG. 14 illustrates a communications device that may include various components configured to perform operations for techniques disclosed herein, in accordance with aspects of the present disclosure.

FIG. 14 illustrates a communications device 1400 that may include various components (e.g., corresponding to means-plus-function components) operable, configured, or adapted to perform operations for the techniques disclosed herein, such as the operations illustrated described with respect to FIG. 10. In some examples, communications device 1400 may be a first wireless node, such as a UE (e.g., UE 120a described with respect to FIGS. 1 and 2) or a network entity (e.g., BS 110a described with respect to FIGS. 1 and 2).

Communications device 1400 includes a processing system 1402 coupled to a transceiver 1408 (e.g., a transmitter and/or a receiver). Transceiver 1408 is configured to transmit and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by the processor 1404, cause processor 1404 to perform the operations illustrated in FIG. 10, or other operations for performing the various techniques discussed herein for PTRSs.

In certain aspects, computer-readable medium/memory 1412 stores code 1414 (an example means for) for transmitting (e.g., for transmitting, to a second wireless node, information regarding PTRS tones for use in designating one or more of the PTRS tones as ZP tones and one or more of the PTRS tones as NZP tones); code 1416 (an example means for) for receiving (e.g., for receiving PTRS transmitted on NZP tones of the one or more PTRS tones); code 1418 (an example means for) for estimating (e.g., for estimating filter coefficients for an inter-carrier interference (ICI) filter based on the PTRS received on the NZP tones).

In certain aspects, processor 1404 has circuitry configured to implement the code stored in computer-readable medium/memory 1412. Processor 1404 includes circuitry 1424 (an example means for) for transmitting (e.g., for transmitting, to a second wireless node, information regarding PTRS tones for use in designating one or more of the PTRS tones as ZP tones and one or more of the PTRS tones as NZP tones); circuitry 1426 (an example means for) for receiving (e.g., for receiving PTRS transmitted on NZP tones of the one or more PTRS tones); circuitry 1428 (an example means for) for estimating (e.g., for estimating filter coefficients for an ICI filter based on the PTRS received on the NZP tone).

In some cases, the operations illustrated in FIG. 10, as well as other operations described herein, may be implemented by one or more means-plus-function components. For example, in some cases, such operations may be implemented by means for transmitting, means for receiving, and means for estimating.

In some cases, means for estimating, includes a processing system, which may include one or more processors, such as receive processor 258, transmit processor 264, TX MIMO processor 266, and/or the controller/processor 280 of UE 120a illustrated in FIG. 2 and/or processing system 1402 of communications device 1400 in FIG. 14. In some cases, means for estimating, includes a processing system, which may include one or more processors, such as receive processor 238, transmit processor 220, TX MIMO processor 230, and/or the controller/processor 240 of BS 110a illustrated in FIG. 2 and/or processing system 1402 of communications device 1400 in FIG. 14.

Transceiver 1408 may provide a means for receiving or transmitting information. Information may be passed on to other components of communications device 1400. Antenna 1410 may correspond to a single antenna or a set of antennas. Transceiver 1408 may provide means for transmitting signals generated by other components of communications device 1400.

In some cases, means for receiving or means for obtaining may include a receiver (such as receive processor 258) or antenna(s) 252 of UE 120a illustrated in FIG. 2. In some cases, means for receiving or means for obtaining may include a receiver (such as receive processor 238) or antenna(s) 234 of BS 110a illustrated in FIG. 2.

In some cases, means for transmitting or means for outputting may include a transmitter (such as the transmit processor 264) or antenna(s) 252 of UE 120a illustrated in FIG. 2. In some cases, means for transmitting or means for outputting may include a transmitter (such as the transmit processor 220) or antenna(s) 234 of BS 110a illustrated in FIG. 2.

Notably, FIG. 14 is just use one example, and many other examples and configurations of communications device 1400 are possible.

PTRS manager 122 and PTRS manager 112 may support wireless communication in accordance with examples as disclosed herein.

PTRS manager 122 and PTRS manager 112 may be an example of means for performing various aspects described herein. PTRS manager 122 and PTRS manager 112, or its sub-components, may be implemented in hardware (e.g., in UL resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, PTRS manager 122 and PTRS manager 112, or its sub-components, may be implemented in code (e.g., as configuration management software or firmware) executed by a processor, or any combination thereof. If implemented in code executed by a processor, the functions of PTRS manager 122 and PTRS manager 112, or its sub-components may be executed by a general-purpose processor, a DSP, an ASIC, a FPGA or other programmable logic device.

In some examples, PTRS manager 122 and PTRS manager 112 may be configured to perform various operations (e.g., receiving, determining, transmitting/sending) using or otherwise in cooperation with the transceiver 1508 or 1608.

PTRS manager 122 and PTRS manager 112, or its sub-components, may be physically located at various positions, including being distributed such that portions of functions are implemented at different physical locations by one or more physical components. In some examples, PTRS manager 122 and PTRS manager 112, or its sub-components, may be a separate and distinct component in accordance with various aspects of the present disclosure. In some examples, PTRS manager 122 and PTRS manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communications by a first wireless node, comprising: receiving, from a second wireless node, information regarding phase tracking reference signal (PTRS) tones; designating one or more of the PTRS tones as zero power (ZP) tones and one or more of the PTRS tones as non-ZP (NZP) tones based, at least in part, on the information; and transmitting a PTRS on the NZP tones.

Clause 2: The method of Clause 1, wherein the information comprises information regarding an inter-carrier interference (ICI) filter.

Clause 3: The method of Clause 2, wherein the information is received via a radio resource configuration (RRC) signaling of a PTRS recommendation.

Clause 4: The method of any of Clauses 1-3, wherein the information indicates a number of the PTRS tones to designate as the ZP tones.

Clause 5: The method of Clause 4, wherein the number comprises a fraction of a total number of the PTRS tones.

Clause 6: The method of any of Clauses 2-5, wherein the information comprises at least a filter type, a filter length, or a combination thereof.

Clause 7: The method of any of Clauses 1-6, wherein designating the one or more PTRS tones as the ZP tones and the one or more PTRS tones as the NZP tones comprises: designating at least a first PTRS tone of the PTRS tones on a first edge of the PTRS as a ZP tone; designating at least a second PTRS tone of the PTRS tones on a second edge of the PTRS as a ZP tone; and designating the PTRS tones not designated as the ZP tones as the NZP tones.

Clause 8: The method of any of Clauses 1-7, wherein designating the one or more PTRS tones as the ZP tones and the one or more PTRS tones as the NZP tones is based on a pattern indicating which of the PTRS tones are to be designated as the ZP tones by the first wireless node.

Clause 9: The method of any of Clauses 1-8, further comprising: determining power boosting to be applied to the NZP tones based, at least in part, on the ZP tones; and applying the determined power boosting when transmitting the PTRS on the NZP tones.

Clause 10: The method of Clause 9, wherein determining the power boosting to be applied to the NZP tones comprises: determining a total power of the PTRS, wherein the total power for the PTRS is maintained when the determined power boosting is applied to the NZP tones.

Clause 11: The method of any of Clauses 1-10, further comprising: applying frequency hopping to one or more of the PTRS tones across different symbols, wherein the frequency hopping is based on at least one of: a predefined hopping pattern, or a hopping pattern signaled via radio resource control (RRC) signaling; and determining power boosting to be applied to the NZP tones in each of the different symbols based, at least in apart, on the ZP tones in each of the different symbols.

Clause 12: The method of any of Clauses 1-11, further comprising: detecting that the PTRS collides with a resource block (RB) of a direct current (DC) tone; and taking one or more actions based on the detection, wherein the one or more actions comprise at least one of: dividing the PTRS into at least two sub-blocks, each of the at least two sub-blocks having a contiguous set of tones; shifting the PTRS by a frequency offset; skipping transmission of the PTRS; or skipping at least a subset of tones from the PTRS and adjusting the power boosting based on the skipped subset of tones.

Clause 13: The method of Clause 12, further comprising, where a size of either of the at least two sub-blocks is equal to or below a threshold value based on a reported filter length: skipping transmission of PTRSs for that sub-block; and adjusting power boosting of the other sub-block, based on the transmission being skipped.

Clause 14: The method of any of Clauses 1-13, wherein: the first wireless node comprises a user equipment (UE) and the second wireless node comprises a network entity, or the first wireless node comprises the network entity and the second wireless node comprises the UE.

Clause 15: A method for wireless communications by a first wireless node, comprising: transmitting, to a second wireless node, information regarding phase tracking reference signal (PTRS) tones for use in designating one or more of the PTRS tones as zero power (ZP) tones and one or more of the PTRS tones as non-ZP (NZP) tones; receiving a PTRS transmitted on the NZP tones of the one or more PTRS tones; and estimating filter coefficients for an inter-carrier interference (ICI) filter based on the PTRS received on the NZP tones.

Clause 16: The method of Clause 15, wherein the information comprises information regarding the ICI filter.

Clause 17: The method of Clause 16, wherein the information is transmitted via a radio resource configuration (RRC) signaling of a PTRS recommendation.

Clause 18: The method of any of Clauses 15-17, wherein the information indicates a number of the PTRS tones to designate as the ZP tones.

Clause 19: The method of Clause 18, wherein the number comprises a fraction of a total number of the PTRS tones.

Clause 20: The method of any of Clauses 15-19, wherein the information comprises at least a filter type, a filter length, or a combination thereof.

Clause 21: The method of any of Clauses 15-20, wherein the second wireless node designates the one or more PTRS tones as the ZP tones and the one or more PTRS tones as the NZP tones by: designating at least a first PTRS tone of the PTRS tones on a first edge of the PTRS as a ZP tone; designating at least a second PTRS tone of the PTRS tones on a second edge of the PTRS as a ZP tone; and designating the PTRS tones not designated as the ZP tones as the NZP tones.

Clause 22: The method of any of Clauses 15-21, wherein the second wireless node designates the one or more PTRS tones as the ZP tones and the one or more PTRS tones as the NZP tones based on a pattern indicating which of the PTRS tones are to be designated as the ZP tones by the second wireless node.

Clause 23: The method of Clause 22, wherein the received PTRS comprises a PTRS transmitted on the NZP tones, with power boosting applied to the NZP tones, wherein the power boosting applied to the NZP tones is determined by the second wireless node based, at least in part, on the ZP tones.

Clause 24: The method Clause 23, wherein the power boosting applied to the NZP tones is determined by the second wireless node by: determining a total power of a block structure of the PTRS; and power boosting the NZP tones such that the total power for the block structure of the PTRS is maintained.

Clause 25: The method of any of Clauses 15-24, wherein the received PTRS comprises a PTRS transmitted on the NZP tones, with power boosting applied to the NZP tones, wherein the power boosting applied to the NZP tones is applied to PTRS tones designated as NZP tones across different symbols when the second wireless node applies frequency hopping of the PTRS tones across the different symbols.

Clause 26: The method of Clause 25, wherein the frequency hopping is based on at least one of: a predefined hopping pattern or a hopping pattern signaled via radio resource control (RRC) signaling.

Clause 27: The method of any of Clauses 15-26, wherein: the first wireless node comprises a network entity and the second wireless node comprises a user equipment (UE), or the first wireless node comprises the UE and the second wireless node comprises the network entity.

Clause 28: An apparatus, comprising: at least one processor; and a memory coupled to the at least one processor, the memory including instructions executable by the at least one processor to cause the apparatus to perform a method in accordance with any one of Clauses 1-27.

Clause 29: An apparatus, comprising means for performing a method in accordance with any one of Clauses 1-27.

Clause 30: A non-transitory computer-readable medium comprising executable instructions that, when executed by one or more processors of an apparatus, cause the apparatus to perform a method in accordance with any one of Clauses 1-27.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first wireless node, comprising:
   receiving, from a second wireless node, information regarding a block of phase tracking reference signal (PTRS) tones that are contiguous in frequency, wherein the information comprises information regarding an inter-carrier interference (ICI) filter;
   designating one or more of the PTRS tones as zero power (ZP) tones and one or more of the PTRS tones as non-ZP (NZP) tones based, at least in part, on the information, wherein the designating comprises:
      designating at least a first PTRS tone of the PTRS tones on a first edge of the block of PTRS tones as a ZP tone based on the information regarding the ICI filter;

designating at least a second PTRS tone of the PTRS tones on a second edge of the block of PTRS tones as a ZP tone based on the information regarding the ICI filter; and designating the PTRS tones in the block not designated as the ZP tones as the NZP tones; and transmitting a PTRS on the NZP tones.

2. The method of claim 1, wherein the information is received via a radio resource configuration (RRC) signaling of a PTRS recommendation.

3. The method of claim 1, wherein the information indicates a number of the PTRS tones to designate as the ZP tones.

4. The method of claim 3, wherein the number comprises a fraction of a total number of the PTRS tones.

5. The method of claim 1, wherein the information comprises at least a filter type, a filter length, or a combination thereof.

6. The method of claim 1, wherein designating the one or more PTRS tones as the ZP tones and the one or more PTRS tones as the NZP tones is based on a pattern indicating which of the PTRS tones are to be designated as the ZP tones by the first wireless node.

7. The method of claim 1, further comprising:
determining power boosting to be applied to the NZP tones based, at least in part, on the ZP tones; and
applying the determined power boosting when transmitting the PTRS on the NZP tones.

8. The method of claim 7, wherein determining the power boosting to be applied to the NZP tones comprises:
determining a total power of the PTRS, wherein the total power for the PTRS is maintained when the determined power boosting is applied to the NZP tones.

9. The method of claim 1, further comprising:
applying frequency hopping to one or more of the PTRS tones across different symbols, wherein the frequency hopping is based on at least one of:
a predefined hopping pattern, or
a hopping pattern signaled via radio resource control (RRC) signaling; and
determining power boosting to be applied to the NZP tones in each of the different symbols based, at least in apart, on the ZP tones in each of the different symbols.

10. A method for wireless communications by a first wireless node, comprising:
receiving, from a second wireless node, information regarding a block of phase tracking reference signal (PTRS) tones that are contiguous in frequency;
designating one or more of the PTRS tones as zero power (ZP) tones and one or more of the PTRS tones as non-ZP (NZP) tones based, at least in part, on the information;
preparing a PTRS for transmission on the NZP tones;
detecting that the PTRS collides with a resource block (RB) of a direct current (DC) tone; and
taking one or more actions based on the detection, wherein the one or more actions comprise at least one of:
dividing the PTRS tones into at least two sub-blocks of tones, each of the at least two sub-blocks having a contiguous set of tones;
shifting the PTRS tones by a frequency offset;
skipping transmission of the PTRS; or
skipping at least a subset of tones from the PTRS and adjusting a power boosting based on the skipped subset of tones.

11. The method of claim 10, wherein:
the one or more actions comprise dividing the PTRS tones into the at least two sub-blocks of tones;
a size of one of the at least two sub-blocks of tones is equal to or below a threshold value based on a reported filter length; and
the method further comprises:
skipping transmission of PTRSs for the one sub-block of tones; and
adjusting power boosting of the other sub-block of tones, based on the transmission being skipped.

12. The method of claim 1, wherein:
the first wireless node comprises a user equipment (UE) and the second wireless node comprises a network entity, or
the first wireless node comprises the network entity and the second wireless node comprises the UE.

13. A method for wireless communications by a first wireless node, comprising:
transmitting, to a second wireless node, information regarding a block of phase tracking reference signal (PTRS) tones that are contiguous in frequency for use in designating one or more of the PTRS tones as zero power (ZP) tones and one or more of the PTRS tones as non-ZP (NZP) tones, wherein:
the information comprises information regarding an inter-carrier interference (ICI) filter;
at least a first PTRS tone of the PTRS tones is designated on a first edge of the block of PTRS tones as a ZP tone based on the information regarding the ICI filter;
at least a second PTRS tone of the PTRS tones is designated on a second edge of the block of PTRS tones as a ZP tone based on the information regarding the ICI filter; and
the PTRS tones in the block not designated as the ZP tones is designated as the NZP tones;
receiving a PTRS transmitted on the NZP tones of the one or more PTRS tones; and
estimating filter coefficients for the ICI filter based on the PTRS received on the NZP tones.

14. The method of claim 13, wherein the information comprises information regarding the ICI filter.

15. The method of claim 14, wherein the information is transmitted via a radio resource configuration (RRC) signaling of a PTRS recommendation.

16. The method of claim 13, wherein the information indicates a number of the PTRS tones to designate as the ZP tones.

17. The method of claim 16, wherein the number comprises a fraction of a total number of the PTRS tones.

18. The method of claim 13, wherein the information comprises at least a filter type, a filter length, or a combination thereof.

19. The method of claim 13, wherein the second wireless node designates the one or more PTRS tones as the ZP tones and the one or more PTRS tones as the NZP tones based on a pattern indicating which of the PTRS tones are to be designated as the ZP tones by the second wireless node.

20. The method of claim 19, wherein the received PTRS comprises a PTRS transmitted on the NZP tones, with power boosting applied to the NZP tones, wherein the power boosting applied to the NZP tones is determined by the second wireless node based, at least in part, on the ZP tones.

21. The method claim 20, wherein the power boosting applied to the NZP tones is determined by the second wireless node by:

determining a total power of a block structure of the PTRS; and power boosting the NZP tones such that the total power for the block structure of the PTRS is maintained.

22. The method of claim 13, wherein the received PTRS comprises a PTRS transmitted on the NZP tones, with power boosting applied to the NZP tones, wherein the power boosting applied to the NZP tones is applied to PTRS tones designated as NZP tones across different symbols when the second wireless node applies frequency hopping of the PTRS tones across the different symbols.

23. The method of claim 22, wherein the frequency hopping is based on at least one of: a predefined hopping pattern or a hopping pattern signaled via radio resource control (RRC) signaling.

24. The method of claim 13, wherein:
the first wireless node comprises a network entity and the second wireless node comprises a user equipment (UE), or
the first wireless node comprises the UE and the second wireless node comprises the network entity.

25. An apparatus for wireless communication by a first wireless node, comprising:
a memory; and
one or more processors coupled to the memory, the memory and the one or more processors being configured to:
receive, from a second wireless node, information regarding a block of phase tracking reference signal (PTRS) tones that are contiguous in frequency, wherein the information comprises information regarding an inter-carrier interference (ICI) filter;
designate one or more of the PTRS tones as zero power (ZP) tones and one or more of the PTRS tones as non-ZP (NZP) tones based, at least in part, on the information, wherein, to designate the one or more of the PTRS tones, the one or more processors are configured to:
designate at least a first PTRS tone of the PTRS tones on a first edge of the block of PTRS tones as a ZP tone based on the information regarding the ICI filter;
designate at least a second PTRS tone of the PTRS tones on a second edge of the block of PTRS tones as a ZP tone based on the information regarding the ICI filter; and
designate the PTRS tones in the block not designated as the ZP tones as the NZP tones; and
transmit a PTRS on the NZP tones.

26. The apparatus of claim 25, wherein:
the first wireless node comprises a user equipment (UE) and the second wireless node comprises a network entity, or
the first wireless node comprises the network entity and the second wireless node comprises the UE.

27. An apparatus for wireless communication by a first wireless node, comprising:
a memory; and
one or more processors coupled to the memory, the memory and the one or more processors being configured to:
transmit, to a second wireless node, information regarding a block of phase tracking reference signal (PTRS) tones that are contiguous in frequency for use in designating one or more of the PTRS tones as zero power (ZP) tones and one or more of the PTRS tones as non-ZP (NZP) tones, wherein:
the information comprises information regarding an inter-carrier interference (ICI) filter;
at least a first PTRS tone of the PTRS tones is designated on a first edge of the block of PTRS tones as a ZP tone based on the information regarding the ICI filter;
at least a second PTRS tone of the PTRS tones is designated on a second edge of the block of PTRS tones as a ZP tone based on the information regarding the ICI filter; and
the PTRS tones in the block not designated as the ZP tones is designated as the NZP tones;
receive a PTRS transmitted on the NZP tones of the one or more PTRS tones; and
estimate filter coefficients for an inter-carrier interference (ICI) filter based on the PTRS received on the NZP tones.

28. An apparatus for wireless communication by a first wireless node, comprising:
a memory; and
one or more processors coupled to the memory, the memory and the one or more processors being configured to:
receive, from a second wireless node, information regarding a block of phase tracking reference signal (PTRS) tones that are contiguous in frequency;
designate one or more of the PTRS tones as zero power (ZP) tones and one or more of the PTRS tones as non-ZP (NZP) tones based, at least in part, on the information;
prepare a PTRS for transmission on the NZP tones;
detect that the PTRS collides with a resource block (RB) of a direct current (DC) tone; and
take one or more actions based on detecting that the PTRS collides with the RB of the DC tone, wherein the one or more actions comprise at least one of:
dividing the PTRS tones into at least two sub-blocks of tones, each of the at least two sub-blocks having a contiguous set of tones;
shifting the PTRS tones by a frequency offset;
skipping transmission of the PTRS; or
skipping at least a subset of tones from the PTRS and adjusting a power boosting based on the skipped subset of tones.

* * * * *